No. 677,578. Patented July 2, 1901.
F. W. LEMP & W. KOEDDING.
APPARATUS FOR PURIFYING LIQUIDS BY ELECTROLYSIS.
(Application filed Oct. 1, 1900.)
(No Model.) 2 Sheets—Sheet 1.

Witnesses
Inventors
F. W. Lemp
W. Koedding
By Attorneys

No. 677,578. Patented July 2, 1901.
F. W. LEMP & W. KOEDDING.
APPARATUS FOR PURIFYING LIQUIDS BY ELECTROLYSIS.
(Application filed Oct. 1, 1900.)
(No Model.) 2 Sheets—Sheet 2.

Witnesses
W. A. Alexander
J. R. Watkins

Inventors
F. W. Lemp
W. Koedding
By Attorneys
Fowler & Fowler

UNITED STATES PATENT OFFICE.

FREDERICK W. LEMP AND WILLIAM KOEDDING, OF ST. LOUIS, MISSOURI.

APPARATUS FOR PURIFYING LIQUIDS BY ELECTROLYSIS.

SPECIFICATION forming part of Letters Patent No. 677,578, dated July 2, 1901.

Application filed October 1, 1900. Serial No. 31,634. (No model.)

*To all whom it may concern:*

Be it known that we, FREDERICK W. LEMP and WILLIAM KOEDDING, citizens of the United States, residing at the city of St. Louis, in the State of Missouri, have invented a certain new and useful Apparatus for Purifying Liquids by Electrolysis, of which the following is such a full, clear, and exact description as will enable any one skilled in the art to which it appertains to make and use the same, reference being had to the accompanying drawings, forming part of this specification.

Our invention has for its object to render liquids, and particularly water, of uniform purity either in large or small quantities and at a minimum expense by subjecting them to the action of electricity, and to that end we employ the apparatus described below.

Figure 1:
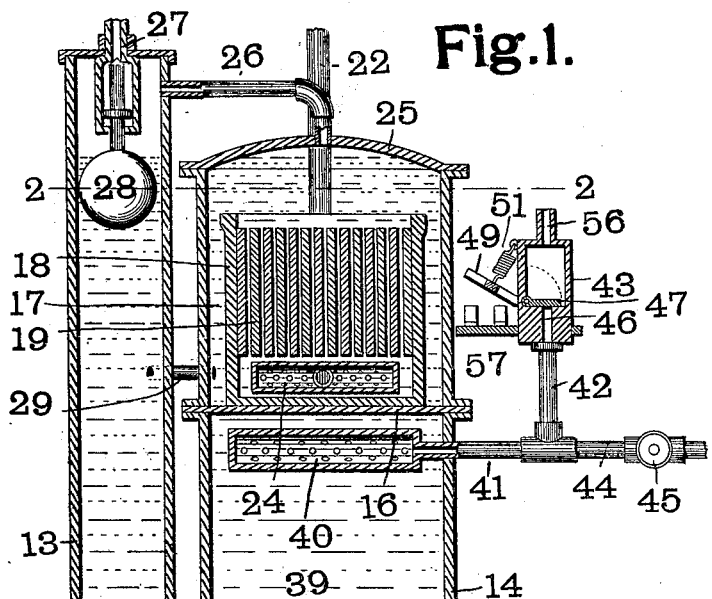
Figure 2:
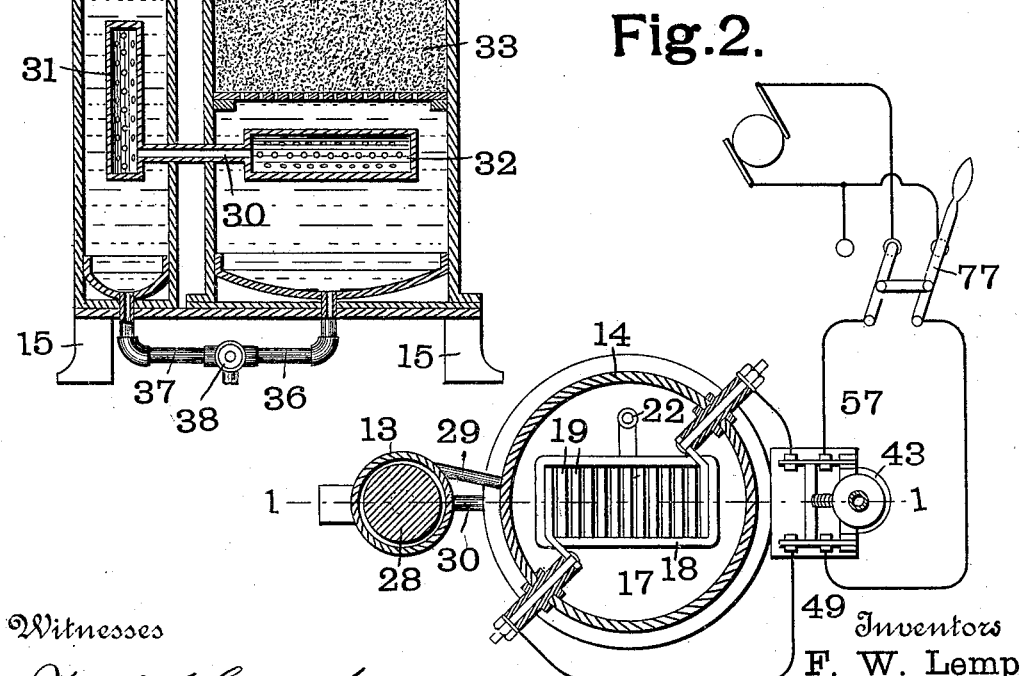
Figure 3:
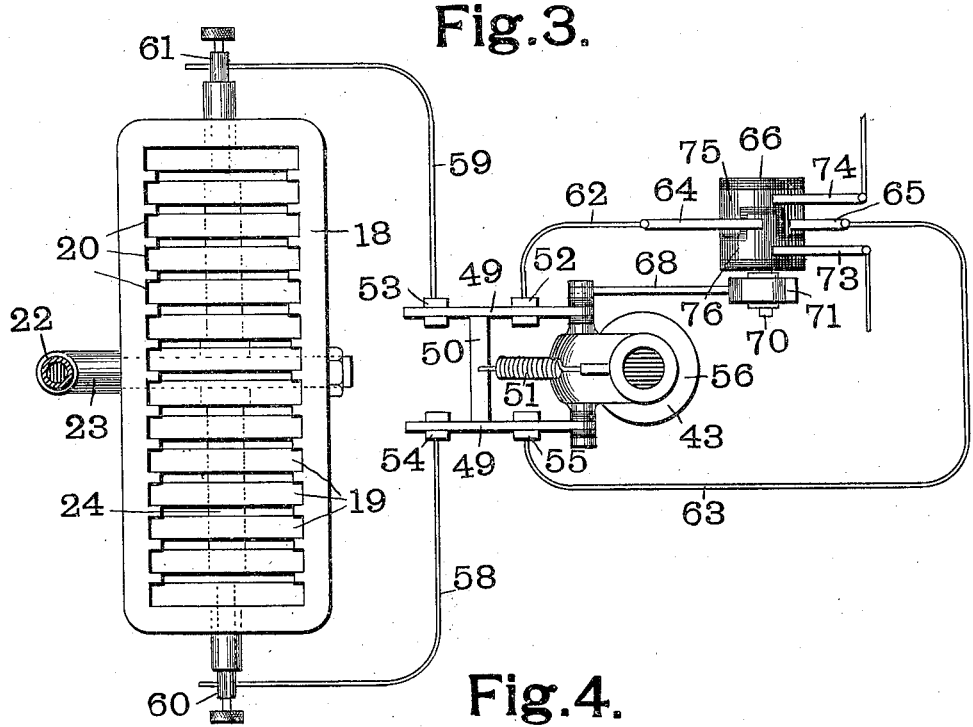
Figure 4:
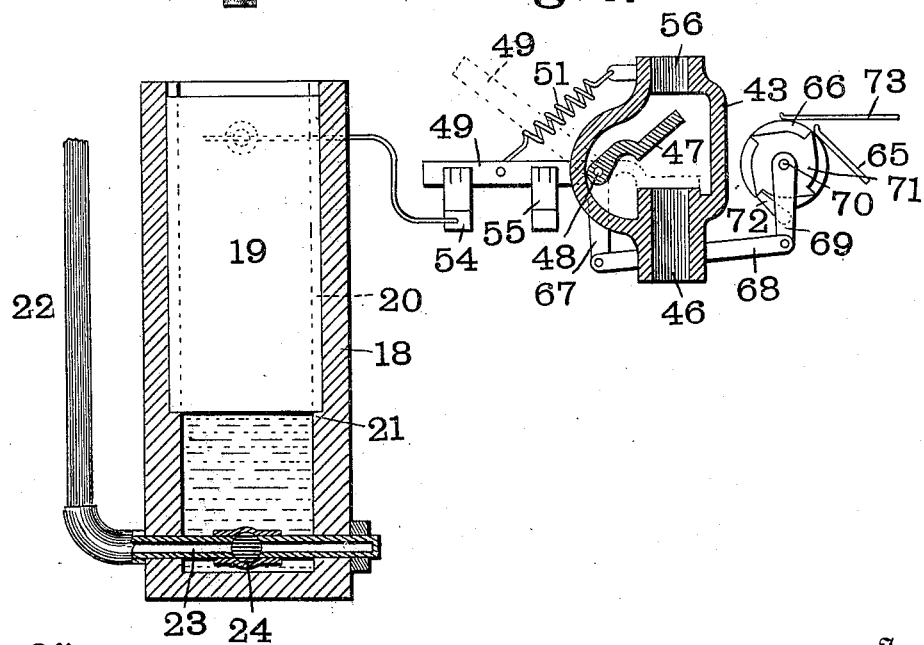

In the drawings, in which like figures of reference refer to like parts in the several different views, Figure 1 is a vertical section of our apparatus, taken on the line 1 1, Fig. 2. Fig. 2 is a horizontal cross-section of the same through the line 2 2, Fig. 1. Fig. 3 is an enlarged detail view of the plate-rack and the plates forming the electrodes of our apparatus, together with a somewhat diagrammatic view of their electrical connections; and Fig. 4 is a vertical section of the same through the line 4 4, Fig. 3.

As will be seen by referring to Fig. 1, our apparatus consists of two vertical cylindrical receptacles 13 14, one of which, 13, is of smaller diameter than the other, and both of which are mounted on suitable supports 15. The receptacle 14 is divided horizontally about one-third of its length from the top by the partition 16, and in the upper chamber 17 thus formed and resting upon the partition 16 is the box 18, of insulating material, which contains a number of vertically-disposed iron plates 19, which, as will be seen more plainly by reference to Figs. 3 and 4, are held firmly in position and kept from contact with one another by being slid into grooves 20 in the sides of the box 18. These grooves are so arranged that when the plates are in position in them the spaces between the plates are very narrow. In practice the plates are from one-tenth to one-sixteenth of an inch apart and may be placed even closer, as there is no danger of contact between the adjacent plates.

The grooves 20 do not extend to the bottom of the insulating-box 18, but end a short distance thereabove, forming the shoulders 21, upon which the plates rest, leaving a considerable space between the lower edges of the plates 19 and the bottom of the box 18. Into this space is led through the top of the receptacle 14 and along the side of the box 18 the intake-pipe 22. As will be seen in Figs. 3 and 4, the horizontal part 23 of the intake-pipe 22 extends under the plate-holding box 18 from the rear to the front and is jointed at its middle point to the horizontal pipe 24, extending at right angles on each side of the pipe 23 almost to the ends of the plate-box 18. The upper side of the pipe 24 is pierced with small escape-holes, as shown in Fig. 1.

From the center of the slightly-domed top 25 of the cylinder 14 leads the pipe 26, which enters the receptacle 13 at a point slightly below its top. In the top of the cylinder 13 is the opening 27, fitted with a valve operated by an automatic ball-float 28 of any suitable kind. The cylinder 13 is also connected with the chamber 17 near the bottom of the latter by means of the pipe 29, which enters the cylinder 13 tangentially for a purpose to be hereinafter mentioned. The lower parts of the two cylinders are also connected by means of the pipe 30, which bears on that end of it which enters the chamber 13 the strainer 31 and on its terminus in the receptacle 14 the perforated ejector 32, immediately above which is placed, preferably, but not necessarily, a filter-bed 33. The concave bottoms of the cylinders 13 and 14 are connected at their lowest points by means of pipes 36 and 37 with the mud-valve 38.

In the lower chamber 39 of the receptacle 14 and immediately below the partition 16 is placed the strainer 40, from which leads the outflow-pipe 41, which carries on its upright extension 42 the valve-casing 43, and which is prolonged horizontally to form the blow-out pipe 44, normally closed by the valve 45. At the top of the valve-casing 43 is the passage 56. The valve-opening 46 is closed by the valve 47, which is pivoted at 48 and carries the outwardly-extending arms 49, to which is attached, by means of the rigidly-fastened cross-piece 50, the spiral spring 51, which normally holds said arms in their upward position and the valve 47 closed, as shown in Fig. 1. The arms 49 form the contact-blades of a double-pole switch whose contact-plates are shown at 52, 53, 54, and 55. These plates are shown in Fig. 1 as attached to the base 57. The contact-plates 53 54 are connected to wires 58 and 59, which are connected to the two exterior plates 19 of the series of plates in position in the plate-holding box by means of suitable insulated binding-posts 60 61, passing through the cylinder 14 into the upper chamber 17.

The contact-plates 52 and 55 are, as shown in Fig. 3, connected to wires 62 and 63, respectively, and are brought in contact, by means of brushes 64 and 65, with the commutator 66, which forms part of an automatic current-reversing mechanism. This current-reversing mechanism is shown in detail in Figs. 3 and 4, and consists in the lever-arm 67, extending downwardly from and rigidly attached to the pivot 48, which also bears rigidly attached to it the contact-blades 49 and the valve 47, as above described. To the lever 67 is pivoted a connecting-bar 68, which at its opposite extremity is pivoted to the crank 69, which in turn is loosely pivoted upon the shaft 70, upon which is rigidly mounted the pinion 71 and the commutator 66. The crank 67 has pivoted to it and in a position to engage with the teeth of the pinion 71 the pawl 72, so that when the water ceases to flow from the outlet-pipe 56 and the spring 51 causes the valve 47 to return to its normally-closed position, as shown in the dotted lines in Fig. 4, the crank 69 will be pulled forward and cause the pawl 72 to actuate the pinion 71, which causes the commutator 66 to make a partial revolution. It will also be seen that at the same time the contact-blades 49 are withdrawn from the contact-plates 52, 53, 54, and 55, and the valve 47 is closed.

73 and 74 are brushes connected, respectively, with the positive and negative terminals of a dynamo or other suitable source of current. These brushes bear upon the insulated commutator-segments 75 and 76, which project into one another, as shown. In such a position as to rest first on one segment and then on the other segment, but always on different segments, are placed the brushes 64 and 65. At each movement of the commutator, as above described, the current flowing through the wires 58 and 59 is reversed in direction in a manner well known in connection with similar current-reversing devices. In Fig. 2 is shown an ordinary three-contact switch 77, by which the current may be reversed by hand where it is not desired that the same be done automatically.

The operation of our apparatus is as follows: The impure water flowing in through the intake-pipe 22 passes upward through the narrow openings between the plates 19 and is there subjected to the powerful electrolytic action of the current, which flows by means of the wires 58 59, binding-posts 60 61, and end electrodes 19 alternately through the intermediate electrodes and the water occupying the spaces between them in series. Each pair of adjacent surfaces of these electrodes will constitute an independent element, and each plate or strip of metal in the series, with the exception of the two end plates, will be a double electrode, being anode on one side and cathode on the other, according to the direction of the electric current. During the passage of the current from external sources a counter electromotive force or a current of polarization is set up in each element between each pair of electrodes, which has the tendency to oppose the flow of the current applied to the terminals of the electrolytic cell. The electrochemical action of such a cell is intense, and varies considerably with the quality of the water treated. It causes the foreign matter held in solution or suspension to form insoluble matter which readily coagulates and as a sediment is easily removed. The possibility also exists that a surplus of oxygen might be developed on the anode, which would have the tendency to form a film of basic oxid of iron (or other oxid, according to the metal of which the electrodes are composed) on the anodes of the elements. It is also found that, as usual in the electrolysis of water, a certain amount of hydrogen is liberated and tends to form a film upon the cathode sides of the plates. The insoluble bodies are carried by the flow of the current of water, as indicated by the arrows in Fig. 1, to the bottom of the chamber 17. This flow of water also washes away the free hydrogen which tends to accumulate on the negative sides of the plates 19, as stated above. Part of this hydrogen escapes into the top of the cylinder 13 through the pipe 26, while the water bearing the insoluble matter is injected tangentially through the pipe 29 into the cylinder 13 and confines the hydrogen in the upper portion of said cylinder. When the pressure of the confined hydrogen grows too great, it is automatically relieved by the depression of the surface of the water which it causes in the cylinder 13, which causes the ball-float 28 to operate the valve 27, thus allowing the hydrogen to escape into the air. Owing to the vortex formed in the cylinder 13 by the tangential injection of the water through the pipe 29 the insoluble matter held in suspension and carried by the current into the chamber 13 being of greater specific gravity than the water itself is caused by the centrifugal effect produced to move to the periphery of the vortex and accumulate against the inner wall of the cylinder 13, whence owing to its greater specific gravity it falls gradually always in close proximity to the said inner wall to the bottom of the cylinder 13 and may be withdrawn through the pipe 37 and mud-valve 38, while the almost pure water thus left along the axis of the vortex flows into the lower part of the cylinder 14 through the strainer 31 and pipe 30 and thence through the filter 33 into the pure-water chamber 39 and is withdrawn for use through the opening 56 in the valve-casing 43, thus causing the valve 47 to operate the current-reversing mechanism. When it is desired to cleanse the apparatus, this direction of flow of the water is reversed and the water entering through the blow-out pipe 45 flows through the filter-bed 33 and pipe 30 into the bottoms of the cylinders 13 and 14 and is withdrawn through the mud-valve 38, washing away all the sediment which may have accumulated in the lower parts of the apparatus. When water is being withdrawn for use through the pipe 56, its flow through the valve-opening 46 opens the valve 47 and causes the contact-blades 49 to close the circuit through the contact-plates 52, 53, 54, and 55, as above described and as shown in Fig. 4, thus causing the electrolytic action to continue and a fresh supply of purified water to flow into the chamber 39. On the other hand, when purified water ceases to be withdrawn from the apparatus the valve 47 closes and the contact-blades 49 are withdrawn from the contact-plates, thus breaking the circuit and discontinuing the purifying operation. On the completion of every movement of the valve from its open to its closed position and back to its open position the commutator of the automatic current-reverser is caused to rotate and reverse the direction of the current flowing in series through the plates 19 and the water occupying the spaces between them. This reversal in direction of the current causes the oxid of iron deposited on the positive sides of the plates 19 to be broken up into metallic iron and oxygen, leaving the iron on the plates and causing the free oxygen to enter into combination with the free hydrogen present in the water to form molecules of water. This cleansing action takes but a short while, so that the apparatus works with practically-intact iron electrodes. These electrodes are made, preferably, of iron and have been so described, but obviously may be of any other metal which will combine easily with oxygen. It is also evident that they need not necessarily be formed of plates of solid conductors, but that strips or bars of suitable shape and dimensions can be used, provided they are placed in the same relation to one another, as described above.

While our apparatus has been described with reference to its use in the purification of water and as especially adapted thereto, it is not necessarily confined to such use, but also may be used to purify other liquids.

What we claim is—

1. In an electrolytic purifier for liquids, a vessel for the liquid, supply and discharge pipes for said liquid, a plurality of electrodes in said vessel, means for passing a current of electricity through said electrodes and liquid, a current-reverser, and automatic means controlled by the flow of the liquid for actuating said current-reverser.

2. In an electrolytic purifier for liquids, a vessel in which the liquid is subjected to the action of an electric current, a plurality of electrodes in said vessel, supply and discharge passages for the liquid, a movable member situated in one of said passages, and a switch and a current-reverser controlled by said movable member for making, breaking and reversing the direction of flow of the current in the circuit.

3. In an electrolytic purifier for liquids, a vessel in which the liquid is subjected to the action of an electric current, a plurality of electrodes in said vessel, supply and discharge passages for the liquid, a movable member in one of said passages, and a current-reverser actuated by said movable member.

4. In an electrolytic purifier for liquids, a vessel for the liquid, a plurality of electrodes in said vessel, means for passing a current of electricity through said electrodes and liquid, a chamber into which the liquid from said vessel is discharged, means for imparting a rotary motion to the liquid in said chamber, and an outlet-opening situated axially in said chamber.

5. In an electrolytic purifier for liquids, a vessel for the liquid, a plurality of electrodes in said vessel, means for passing a current of electricity through said electrodes and liquid, a cylindrical chamber, a passage discharging the liquid from said vessel tangentially into said cylindrical chamber, and a discharge-opening located axially in said cylindrical chamber.

In testimony whereof we have hereunto set our hands and affixed our seals in the presence of the two subscribing witnesses.

FREDERICK W. LEMP. [L. S.]
WM. KOEDDING. [L. S.]

Witnesses:
J. H. HONERKAMP,
CHAS. BOSSHARD, Jr.